March 4, 1941.  P. T. FARNSWORTH  2,233,887
IMAGE PROJECTOR
Original Filed Feb. 6, 1935
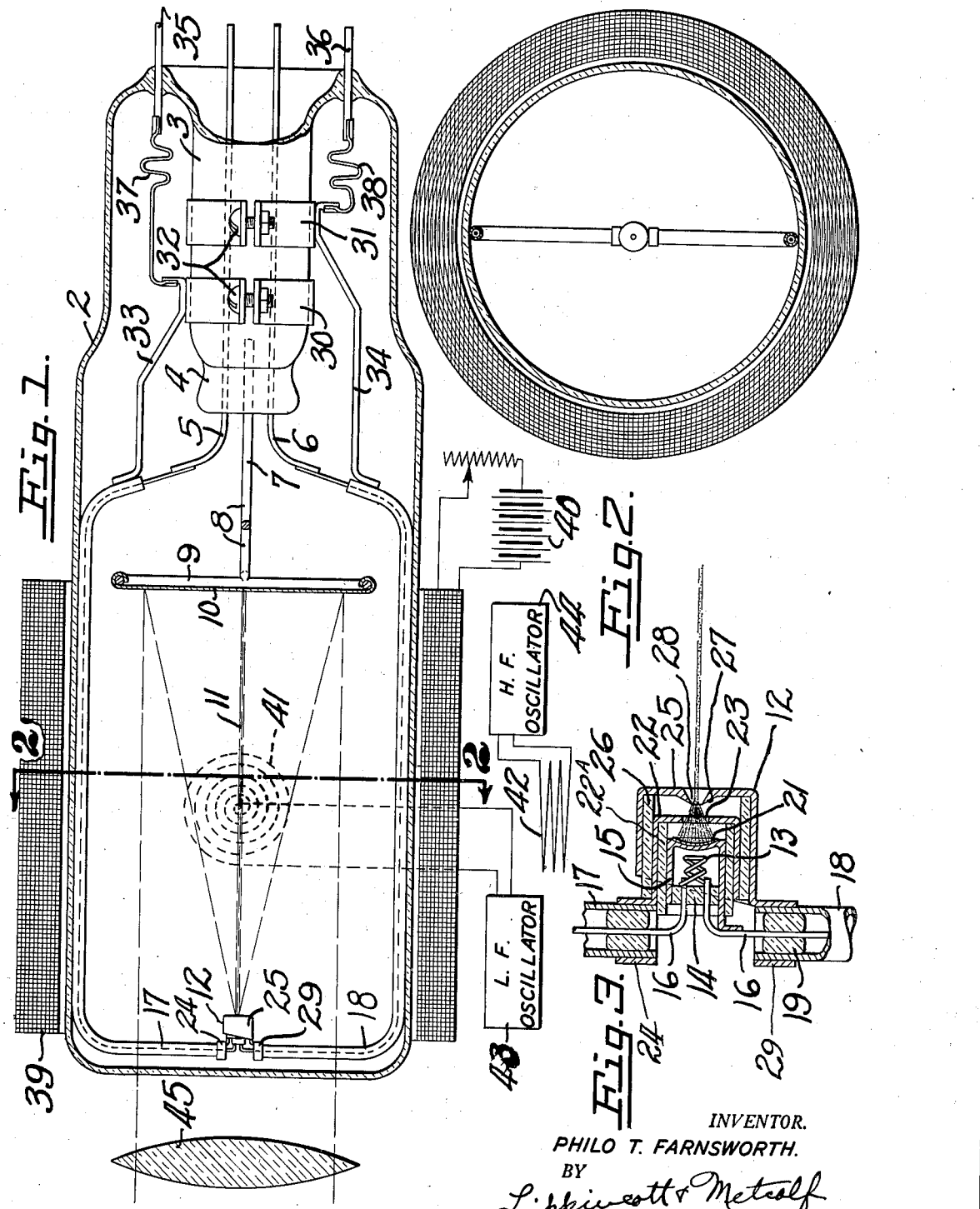
INVENTOR.
PHILO T. FARNSWORTH.
BY
Lippincott & Metcalf
ATTORNEYS.

Patented Mar. 4, 1941

2,233,887

UNITED STATES PATENT OFFICE 2,233,887

IMAGE PROJECTOR

Philo T. Farnsworth, San Francisco, Calif., assignor, by mesne assignments, to Farnsworth Television & Radio Corporation, Dover, Del., a corporation of Delaware Original application February 6, 1935, Serial No. 5,199. Divided and this application June 13, 1938, Serial No. 213,335

3 Claims. (Cl. 178—7.5)

This application is a division of my United States application, Serial No. 5,199, filed February 6, 1935.

My invention relates to cathode ray tubes for producing optical images, and more particularly to means for creating a cathode ray beam in such a tube of small cross section, in combination with focusing means for maintaining the spatial relationship of the electrons in the beam during passage thereof between electrodes in the tube. The invention has a particular application in the field of television.

Among the objects of my invention are: to provide a means for the projection of enlarged images on the screen externally of the tube; to provide means and a method for producing an electron beam of very small cross section in cathode ray tubes; to provide means, in a tube of the character described wherein a cathode ray beam is projected from an electron gun having a beam discharge aperture therein, for creating a beam having a cross section smaller than that of the aperture; to provide means for preventing substantial expansion of said beam during passage thereof between its point of discharge and an electrode within the tube; to provide a cathode ray tube, for use in television receiving apparatus, which is capable of producing an optical image possessing increased image definition; to provide means, in cathode ray tubes wherein an image may be produced by the impact of cathode rays on successive elemental areas of a screen so that these areas may be raised to degrees of incandescence in accordance with the intensity of bombardment of the areas by a beam of such rays modulated by television signals, for producing the incandescence with lesser expenditure of power; to provide a cathode ray tube possessing a high degree of sensitivity; and to provide improved apparatus for the advancement of the television art.

Other objects of my invention will be apparent or will be specifically pointed out in the description forming a part of this specification, but I do not limit myself to the embodiment of the invention herein described, as various forms may be adopted within the scope of the claims.

Referring to the drawing:

Figure 1 is a longitudinal sectional view, parts of the view being shown in elevation, of a cathode ray tube embodying my invention. Certain of the apparatus and circuits used in the operation of the tube, for the production of television images, are also shown, these being diagrammatically represented and reduced to simplest terms.

Figure 2 is a transverse sectional view of Figure 1, the plane in which the view is taken being indicated by the line 2—2 of the latter figure.

Figure 3 is an enlarged longitudinal sectional view of the electron gun.

Briefly, and in its broadest aspect and preferred form, my invention comprises the creation, in a cathode ray tube wherein an electron beam generator is provided having an aperture therein through which a beam may be projected on to a screen to produce an optical image, of a beam having a cross section smaller than the cross section of the aperture, and the provision of means for maintaining the size of the beam during passage thereof from its point of formation to the screen. Means are also provided for directing the light from the image produced on the screen, through an objective lens, along a path coextensive with the path of the electron beam, so that an optical image may be projected on a viewing screen externally of the tube.

The cathode ray tubes in general use contain, at one end thereof, a group of cooperating electrodes, termed the electron gun, by means of which an electron discharge, generated by one of the electrodes, is accelerated and caused to pass through another electrode having an aperture therein which defines the cross-sectional shape of the cathode ray beam thus formed, this beam being projected on to a fluorescent screen located at the other end of the tube. The impact of the electrons in the beam with the screen causes fluorescence of the portion thereof bombarded and the luminous spot thus formed may be caused to trace a visual pattern, by means of which oscillatory currents may be analyzed. The tube may be made to reproduce television images by the provision of means for deflecting the beam cyclically in two directions, and also providing for modulation of the beam by a train of television signals. A picture pattern may thus be traced, on the fluorescent screen, which is an optical translation of the signals.

The material usually used in the formation of these screens possesses large luminous efficiency with low power input to the tube, but the brilliancy of the resulting pattern is low and is marked by a decided bluish or greenish tint which makes it undesirable for television use. In addition to this the application of higher power to the tube, in an effort to increase the brilliancy of the image, will cause the fluorescent material to break down and become inactive.

These deficiencies, in the fluorescent type of screen, have led to the use, by me, of a thin metallic screen having a thickness of the order of 50 to 100×10⁻⁶ inch, which may be raised to incandescence under the impact of the cathode rays and which, due to its character, being preferably constructed of tantalum or other of the refractory metals such as tungsten or molybdenum, will withstand more intense electron bombardment without sputtering or deterioration, than will the fluorescent type of screen. Another decided advantage in favor of the use of the metallic screen is that the image produced thereby is a dazzling white, so intense in fact that it is harmful to view it with the naked eye. The application, Serial No. 78,183, filed May 6, 1936, now United States Patent No. 2,098,000 issued November 2, 1937, and of which I was the joint inventor with Bernard C. Gardner, fully discloses and claims the use of such and other heat screens formed from refractory oxides.

In the use of the heat screen, to cause incandescence, considerably more power must be put into the cathode ray beam than was required to create an image in the types of tubes using fluorescent screens, for the reason that to produce the first visible glow from the screen, a temperature in the order of 800° K. is necessary, and to raise the screen to incandescence a temperature approaching 2500° K. is required. It is obvious, therefore, that to cause heating of the screen over such a range of temperature, considerable power must be present in the electron beam. Another factor which tends to increase the current necessary for operation is the tendency of the electrons in the beam to diverge after leaving the electron gun aperture, with the result that they impinge against the screen over a relatively large area and, since this increases the mass of metal of the screen in the path of the beam, the time required to raise the mass to incandescence is lengthened, making the tube sluggish in operation. To shorten this time, the power in the beam must be increased.

I have provided means whereby divergence of the electrons in the beam is prevented and, in addition to this, means are provided for forming a beam having a cross section considerably less than the diameter of the aperture in the electron gun. The benefits gained by these improvements are obvious. In the first instance, concentration of the area of the screen under bombardment permits of the reproduction of television images possessing finer detail, in that a greater number of picture elements are obtained; and secondly, the substantial reduction in the size of the beam reduces the mass of metal in the screen under impact by the cathode rays, consequently the operation of the tube is made more sensitive by the accelerated response of the screen areas to changes in electronic density of the beam, and by the lesser amount of power required to excite the screen, due to the concentration of the beam cross section.

I have also provided means whereby light from the image formed on the screen may be directed through a lens, and be projected, in any desired degree of enlargement, on a viewing screen disposed externally of the tube. The resulting image possesses greater brilliancy than the image produced heretofore by the use of screens of the character described, due to the fact that the present image is transmitted from the surface of the screen under bombardment by the cathode rays, and not from the opposite surface as is the case in the above-mentioned tubes.

In greater detail, I have illustrated in Figure 1 of the drawing, television apparatus in which the improvements of my invention are incorporated and which comprises an evacuated envelope 2 having a stem 3 formed at one end thereof, the stem being provided with a press 4 in which are sealed a pair of current-carrying leads 5 and 6 and a dummy lead 7.

The dummy lead is provided with forked extensions 8 to the ends of which is secured a rectangular wire frame 9. A sheet of refractory metal 10, preferably tantalum, is welded at the edges thereof to the frame 9 and provides the surface or the heat screen, by which term it is known in the art, which is subjected to the impact of cathode rays in an electron beam 11, projected from an electron gun, generally indicated by the numeral 12, situated in front of the heat screen near the opposite transparent end of the envelope.

The electron gun is shown in detail in Figure 3, and comprises a heating element 13 enclosed within a chamber formed by the insulator 14 and a tubular shell 15. A pair of conductors 16 are provided and are passed through tubes 17 and 18, the conductors being insulated from the tubes by ceramic ferrules 19 spaced at intervals in the tubes, and the conductors terminating in junctions with the leads 5 and 6, as shown in Fig. 1. The latter leads may be connected to a suitable power source, not shown, from which current may be taken to energize the heating element 13. The shell 15 is provided with an outer concave face on which is deposited a substance 21, preferably an alkaline earth oxide, which is capable of copious electron emission when heated. The combined elements just described, that is, the heating element and the oxide coated shell 15, form the cathode by means of which an electron discharge may be instituted.

Disposed concentrically with the cathode and insulated therefrom by the sleeve 22A, is a second shell-shaped member or control electrode 22. The end wall of this electrode is provided with an aperture 23 spaced from the face of the cathode, and a socket 24 is provided, formed integrally with the electrode for connecting it with the tube 17.

Still another shell-like member or accelerating anode 25 is provided, overlying the control electrode 22 and insulated therefrom by the sleeve 26. The end wall of this electrode is provided with an inwardly turned truncated portion 27 which provides an aperture 28 in alignment with, and slightly spaced from, the aperture 23. A socket 29 is also provided for the accelerating anode 25 by means of which it may be connected to the tube 18.

The stem 3 is provided with spaced split bands 30 and 31 secured by suitable screws 32, and leads 33 and 34 connect the tubes 17 and 18 with the bands 30 and 31, respectively. Leads 35 and 36, sealed into the base of the envelope 2, are connected to the bands 30 and 31 by flexible connectors 37 and 38, respectively.

When suitable current is supplied to the heater the temperature thereof is raised to a value sufficient to heat the oxide layer 21, whereupon electron emission starts. By supplying the accelerating anode 25 with a highly positive bias with respect to the cathode, the electrons liberated by the latter will be drawn through the aperture 28 and, due to their acquired velocity, will be propelled on to the screen 10 in the form of a cathode ray beam. It is preferable that the aperture 28 be made relatively large so that the maximum portion of the electrons emitted by the cathode will be drawn therethrough.

I have found, as is clearly shown in a preferred form in Figure 3, that by using substantially the shape of electrodes illustrated, and supplying the electrodes with the proper potentials, the electron stream will be focused sharply slightly before it reaches the plane of the accelerating anode aperture 28, to a diameter which is considerably less than the diameter of the aperture 28, this being due to the fact that the converging stream of electrons, from the cathode, due to their high velocity in passing through the aperture 23, will not have time to diverge substantially before reaching the plane of the face of the anode 25. Since, due to the fact that the majority of electrons liberated by the cathode pass through the anode aperture, it will be seen that a beam of very small diameter, having very great electron density, will be formed. Although a cathode ray beam of such diameter and density is ideally suited for the production of images of marked brilliancy and definition, the concentration of the beam is of no avail if means are not provided for maintaining the beam size during its passage to the screen, for the reason that once outside of the discharge aperture, the electrons in the beam will normally diverge and will arrive at the screen in greater spaced relationship than when they were discharged.

I have provided means for preventing this divergence of the electrons, thus making it possible to obtain a cathode ray beam which is concentrated in an area at the screen considerably smaller in size than the aperture of the electron gun. I accomplish this by providing a solenoid 39 disposed about the envelope 2 and adapted to be energized from a direct-current source 40 so that an intense magnetic field is established substantially parallel to the normal path of flight of the electrons in the beam. It will be seen that since the focusing or concentration of the electron beam occurs substantially in alignment with the face of the accelerating anode 25, the condensed beam will pass immediately into the influence of the magnetic field created by the solenoid 39 and hence divergence of the electrons is prevented. I prefer to adjust the magnetic field for a magnetic focus, preferably an order higher than the first, so that the beam will have definite focal points, thus producing an intense spot.

It will be apparent that a cathode ray beam of such dimensions may be utilized to produce television images of intense brilliancy and very fine detail. I accomplish this by providing beam deflecting coils 41 and 42 driven by oscillators 43 and 44, respectively, which are capable of delivering an alternating current of saw-tooth wave form to the coils. The coils are disposed so that their fields will act at right angles on the electron beam, causing the latter to be deflected cyclically in two directions, and to scan successive elemental areas of the screen. By connecting the control anode 22 with the output circuit of a television receiver, so that signals therefrom are impressed on this electrode, the cathode ray beam will be modulated in accordance with the amplitude of the signals and consequently a luminous image will be traced on the screen which is an optical translation of the signals.

The light transmitted from the screen may be directed through an objective lens system 45, diagrammatically shown, and be projected on to a viewing screen or other surface outside of the tube.

It is well known in the photographic art that a "softened" picture, i. e., one which is not possessed of great contrast between light and shadow, may be produced by placing an object in front of the camera lens to obstruct some of the light passing thereinto. This object is usually in the form of a wedge-shaped card placed so that its pointed end projects into and cuts off a V-shaped segment of the light beam. The effect of this object is to create two superposed images on the photographic plate, one being a sharp image, being of course slightly subdued in brilliancy by an amount equal to the amount of light obstructed by the object, and the other being a diffused image which modifies the sharp image by slightly blurring the lines of demarcation between areas thereof. The resulting picture is possessed of soft tone which is very pleasing to the eye. Since the object is out of the focus of the lens, no part of the image will be obscured thereby.

This condition also obtains in the tube of my invention. The position of the electron gun and its supporting tubes, in the path of the light rays emanating from the screen, will cause a slight diffusion of the projected image at the viewing screen, but since the obstruction to light offered thereby is very slight, and since the brilliancy of the projected image is greatly increased, any slight diffusion that exists will not be objectionable.

The cathode ray tube just described is far superior to the average tube of such character in present use, for the reason that it is capable of producing a television image of intense brilliancy and fine definition with relatively low power input. The factors contributory to this are the use of an electron beam of a size smaller than was heretofore practical and the use of a magnetic field for maintaining the reduced size of the beam during its passage between electrodes in the tube. By proper design of the electron gun and by proper regulation of the strengths of the electrostatic and magnetic fields, it is possible to obtain a beam diameter as small as one-tenth the size of the electron gun aperture.

It will be understood that I may prefer to substitute electrostatic focusing for the magnetic focusing described, this being readily done by providing, within the tube, and aligned axially with the normal direction of electron flow, a tubular electrode provided with a suitable charge to provide an electrostatic field through which the electron beam passes.

While I have chosen to describe my invention in connection with a television receiving tube, I do not desire to be limited to the use of such a tube, as my invention is applicable to other devices wherein a cathode ray beam is utilized, such applications being readily apparent to those skilled in the art.

I claim:

1. The combination, in a television image projector having a surface on which an illuminated optical image may be formed by electron impact and an objective lens through which light from said surface may be directed to an exterior viewing position, of cathode ray generating means for forming said image on said surface, said means being disposed between said surface and said lens in the path of said light and of sufficiently small size to avoid observable optical distortion of said image, the said lens, surface and generating means being substantially coaxial.

2. The combination, in a television image projector having a surface on which an illuminated optical image may be formed by electron impact and an objective lens through which light from said surface may be directed to an exterior viewing position of cathode ray generating means for forming said image on said surface, said means being disposed between said surface and said lens in the path of said light, and means being capable of small light obstruction, the said lens, surface and generating means being substantially coaxial.

3. The combination, in a television image projector having a surface on which an illuminated optical image may be formed by electron impact and an objective lens through which light from said surface may be directed to an exterior viewing position, of cathode ray generating means for forming said image on said surface, said means being disposed between said surface and said lens in the path of said light, said means being disposed out of the focus of said lens and of sufficiently small size to avoid observable optical distortion of said image, the said lens, surface and generating means being substantially coaxial.

PHILO T. FARNSWORTH.